United States Patent
Mori et al.

(10) Patent No.: US 8,893,842 B2
(45) Date of Patent: Nov. 25, 2014

(54) MOTORCYCLE AND SHOCK-ABSORBER

(75) Inventors: Yotaro Mori, Wako (JP); Yusaburo Tani, Wako (JP); Akihiko Matsukawa, Wako (JP); Tatsuya Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/594,068

(22) Filed: Aug. 24, 2012

(65) Prior Publication Data
US 2013/0048402 A1 Feb. 28, 2013

(30) Foreign Application Priority Data

Aug. 30, 2011 (JP) .................................. 2011-187850

(51) Int. Cl.
B62D 61/02 (2006.01)
F16F 9/00 (2006.01)
B62K 25/28 (2006.01)
F16F 9/06 (2006.01)

(52) U.S. Cl.
CPC ............... *F16F 9/065* (2013.01); *B62K 25/286* (2013.01)
USPC ........... 180/227; 180/229; 280/286; 280/277; 188/283; 188/321.11

(58) Field of Classification Search
USPC ............................ 180/227, 229; 280/286, 277
See application file for complete search history.

(56) References Cited

U.S. PATENT DOCUMENTS

| 7,178,620 | B2 * | 2/2007 | Toyoda ......................... 180/227 |
| 7,472,772 | B2 * | 1/2009 | Ozeki ........................... 180/218 |
| 7,547,030 | B2 * | 6/2009 | Toyoda et al. ................ 280/286 |
| 2002/0043415 | A1 * | 4/2002 | Okuma et al. ................ 180/225 |
| 2011/0079458 | A1 * | 4/2011 | Nishiyama et al. ........... 180/227 |

FOREIGN PATENT DOCUMENTS

JP 2009-83836 A 4/2009

* cited by examiner

*Primary Examiner* — Joseph M Rocca
*Assistant Examiner* — Marlon Arce
(74) *Attorney, Agent, or Firm* — Birch, Stewart, Kolasch & Birch, LLP

(57) ABSTRACT

A technique capable of suppressing a rise in the temperature of a shock-absorber. A motorcycle includes a swing arm having a front end swingably supported by a body frame. A shock-absorber includes a rear end supported by the swing arm via a link and an upper end supported by the body frame via a support hole. A cylindrical reserve tank is connected to the shock-absorber for reserving the hydraulic operating fluid flowing into the shock-absorber, the reserve tank is arranged such that an axis thereof is positioned above the axis of the support hole provided in the upper end of the shock-absorber and extends in the width direction of a vehicle.

12 Claims, 8 Drawing Sheets

MOTORCYCLE AND SHOCK-ABSORBER

CROSS-REFERENCE TO RELATED APPLICATIONS

The present application claims priority under 35 USC 119 to Japanese Patent Application No. 2011-187850 filed Aug. 30, 2011 the entire contents of which are hereby incorporated by reference.

BACKGROUND OF THE INVENTION

1. Field of the Invention

The present invention relates to a motorcycle comprising a shock-absorber and the improved technique of the shock-absorber.

2. Description of Background Art

A motorcycle is known that includes a shock-absorber spanning between a body frame and a rear swing arm. See, for example, Japanese Laid-open Patent Publication No. 2009-83836, FIGS. 2 and 4.

As shown in FIGS. 2 and 4 of Japanese Laid-open Patent Publication No. 2009-83836, a shock-absorber (24) (parenthetic numbers denote the reference numerals in Japanese Laid-open Patent Publication No. 2009-83836; hereinafter the same shall apply) supporting a rear swing arm (23) is disposed behind an engine (17). And a reserve tank (24b) is provided above the shock-absorber (24). On the right side of the reserve tank (24b) in the width direction of a vehicle, there is provided an exhaust pipe (32) extending to the rear direction of the vehicle from an exhaust port (17f) of the engine (17).

The reserve tank (24b) is disposed in the vicinity of the exhaust pipe (32) through which the highly heated exhaust gas passes. In addition, a cylinder (24a) as the body portion of the shock-absorber (24) is disposed in front of the reserve tank (24b), and the front of the reserve tank (24b) is shielded by the cylinder (24a). Since the front of the reserve tank (24b) is shielded and heating elements such as the engine are disposed in the vicinity thereof, the temperature of the reserve tank (24b) tends to be easily raised.

Considering the operation of a shock-absorber, it is required that the temperature of the shock-absorber should be stable. Therefore, a technique capable of suppressing the rise in temperature of the shock-absorber is desired.

SUMMARY AND OBJECTS OF THE INVENTION

It is an object of an embodiment of the present invention to provide a technique capable of suppressing the rise in the temperature of a shock-absorber.

According to an embodiment of the present invention, a motorcycle includes a body frame; an engine supported by the body frame; a swing arm having a front end that is swingably supported by the body frame or the engine and with a rear end rotatably supporting a rear wheel; a shock-absorber having a lower end supported by the swing arm and being supported by the body frame via an upper end support hole with an axis thereof extending in the width direction of a vehicle with respect to the body frame. A cylindrical reserve tank is connected to the shock-absorber for reserving the hydraulic operating fluid flowing into the shock-absorber, an axis of the cylindrical reserve tank is arranged such that aiming in the width direction of a vehicle, the axis of the reserve tank is positioned above the axis of the upper end support hole of the shock-absorber in a side view.

According to an embodiment of the present invention, the shock-absorber is attached to the body frame such that the outer circumferential lower end of the reserve tank is substantially on the same level as or higher than the axis of the support hole in a side view of the vehicle.

According to an embodiment of the present invention, the body frame includes a head pipe, a main frame extending downward to the rear direction of the vehicle from the head pipe, and seat frames mounted on the rear portion of the main frame and supporting a seat on which a rider sits. The reserve tank is disposed between a pair of the left and right seat frames so as to overlap the seat frames in a side view of the vehicle.

According to an embodiment of the present invention, a fuel tank is disposed above the engine in a space through which a flow of air flows. The reserve tank is arranged such that the outer circumferential lower end of the reserve tank is positioned above the upper end of the engine.

According to an embodiment of the present invention, the engine is disposed in front of the shock-absorber with reference to the vehicle. An air cleaner is disposed behind the shock-absorber with reference to the vehicle with the air cleaner being connected with the engine by a connecting tube. The connecting tube is disposed on the left and right sides of the shock-absorber in the width direction of a vehicle.

According to an embodiment of the present invention, the shock-absorber includes a cylinder member that is disposed such that its longitudinal direction coincides with the vertical direction of a vehicle. A piston is accommodated in the cylinder member so as to be movable with a piston rod extending downward from the piston. The cylindrical reserve tank is attached to the cylinder member for reserving the excessive hydraulic operating fluid. A stay portion extends upward from the upper surface of the cylinder member with a support hole being provided in the stay portion, the stay portion is communicated with a support member that is provided on the vehicle body side using the support hole, the support hole is provided such that the axis thereof is substantially perpendicular to an axis of the cylinder member. The reserve tank is arranged such that an axis thereof is parallel to the axis of the support hole and the axis thereof is positioned above the upper end of the support hole as well as outside the outer surface of the cylinder member when viewed visually along the axis of the support hole.

According to an embodiment of the present invention, the axis of the reserve tank is positioned above the axis of the upper end support hole of the shock-absorber, which prevents the shock-absorber from shielding a part of the reserve tank, allowing more of a flow of air to hit the reserve tank. As a result, it is possible to enhance the cooling performance of the reserve tank and to suppress the rise in temperature of the reserve tank.

In addition, the axis of the reserve tank is positioned above the axis of the upper end support hole of the shock-absorber and extends in the width direction of a vehicle, which easily secures the space in the left-and-right direction of the shock-absorber and can arrange various parts (for example intake and exhaust system members).

According to an embodiment of the present invention, the outer circumferential lower end of the reserve tank is substantially on the same level as or higher than the axis of the support hole of the shock-absorber in a side view of the vehicle. Since the larger area of the reserve tank is disposed in the upper portion of the shock-absorber, the exposed surface area of the reserve tank becomes further larger in the front view of a vehicle, allowing more of a flow of air to hit the reserve tank. As a result, it is possible to enhance the cooling performance of the reserve tank and to suppress the rise in temperature of the shock-absorber.

According to an embodiment of the present invention, the reserve tank is disposed so as to overlap the seat frames in a side view of the vehicle and the sides of the reserve tank are guarded by the seat frames, which can protect the reserve tank from external forces.

According to an embodiment of the present invention, the outer circumferential lower end of the reserve tank is positioned above the upper end of the engine.

The flow of air flowing in the space hits the outer circumference of the reserve tank without being shielded by the engine. Thus, the air flows into the reserve tank more easily compared to the case where the outer circumferential lower end of the reserve tank is on the same level as or lower than the upper end of the engine, which thereby can cool down the reserve tank well. Further, the reserve tank is disposed above the upper end of the engine. The heat affection of the engine can be reduced by extending the distance between the engine as a heating element and the reserve tank.

According to an embodiment of the present invention, the connecting tube is disposed on the left and right sides of the shock-absorber in the width direction of a vehicle, which thereby can secure larger intake capacity compared to the case where the connecting tube is disposed either to the left or right side of the shock-absorber in the width direction of a vehicle.

According to an embodiment of the present invention, the axis of the reserve tank is positioned above the upper end of the support hole of the cylinder member as well as outside the outer surface of the cylinder member, which thereby allows of a flow of air to hit the reserve tank more easily compared to the case where the axis of the reserve tank is disposed inside the outer surface of the cylinder member or below the upper end of the support hole of the cylinder member. As a result, it is possible to enhance the cooling performance of the reserve tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
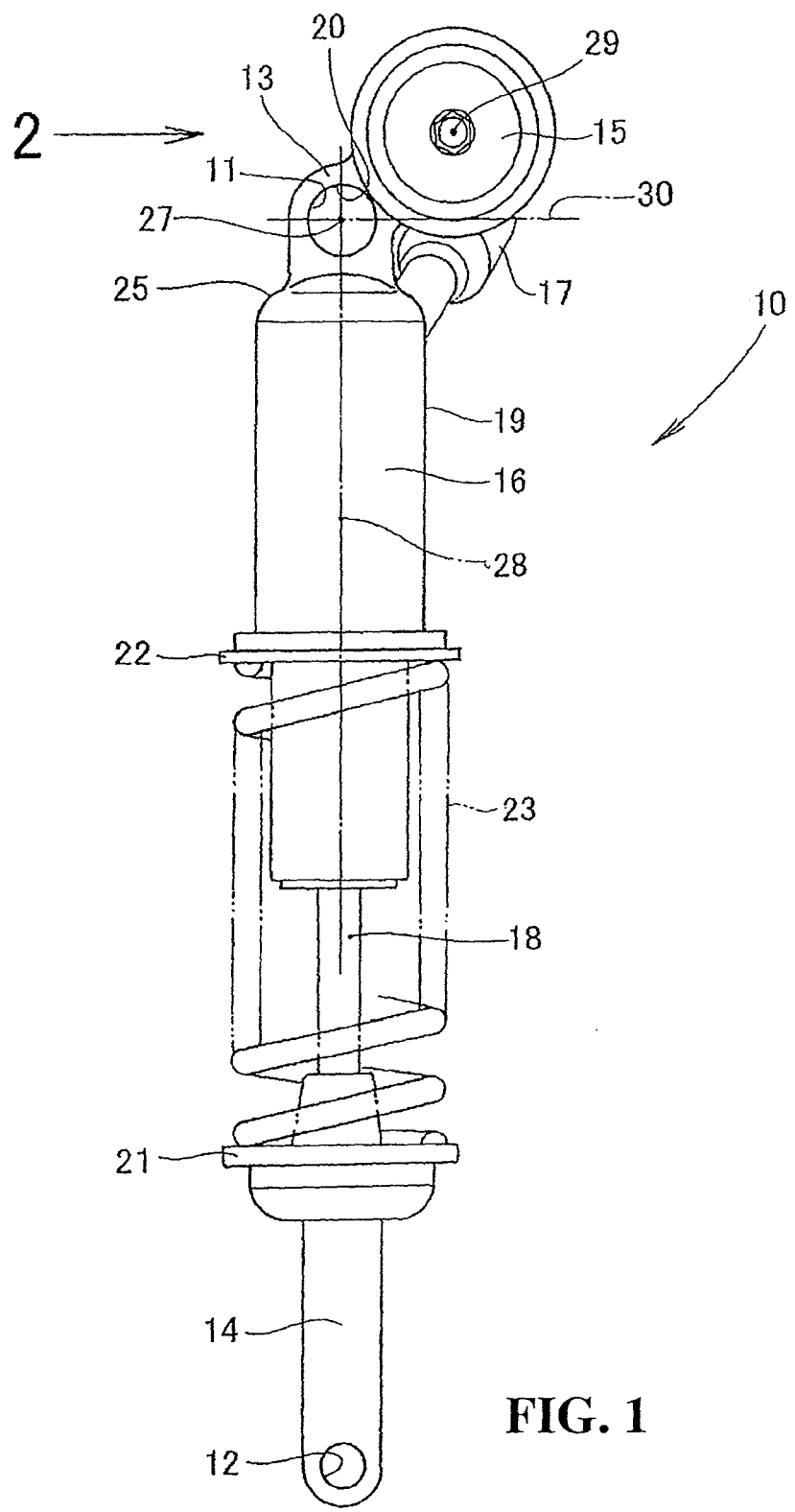
FIG. 1 is a left side view of a shock-absorber according to the embodiment of the present invention.

Hereinafter, the embodiment of the present invention will now be described. In the following drawings and embodiment, directions such as upper and lower, front and rear, and left and right are formed respectively with reference to a rider sitting on the seat of the motorcycle. The orientation of each drawing is the same as that of the reference numerals included therein.

First, the embodiment of the present invention will now be described with reference to the drawings.

As shown in FIG. 1, a shock-absorber 10 has an upper stay portion 13 in which an upper end support hole 11 is provided with a reserve tank 15 being secured to the upper stay portion 13 for reserving the excessive hydraulic operating fluid. A cylinder member 16 is secured to the lower end of the upper stay portion 13 and is filled with the hydraulic operating fluid within with an adjuster portion 17 that spans between the cylinder member 16 and the reserve tank 15 and adjusts the flow volume of the hydraulic operating fluid flowing between the reserve tank 15 and the cylinder member 16. A piston rod 18 extends downward from the cylinder member 16 with a lower stay portion 14 being secured to the lower end of the piston rod 18 and in which a lower end support hole 12 is provided. A flange-shaped lower flange portion 21 is provided in the vicinity of the lower stay portion 14 and supports the lower end of a spring 23. An upper flange portion 22 supports the upper end of the spring 23.

The stay portion 13 as the upper stay portion extends upward from an upper surface 25 of the cylinder member, the upper end support hole 11 is provided on the stay portion 13, and the stay portion 13 is connected to the support member which is provided on the vehicle body side using the upper end support hole 11. The upper end support hole 11 is provided such that the axis 27 thereof is substantially perpendicular to an axis 28 of the cylinder member 16.

In the drawings, an imaginary center line 30 is drawn in the shock-absorber 10 in the horizontal direction of the upper end support hole 11.

Figure 2:
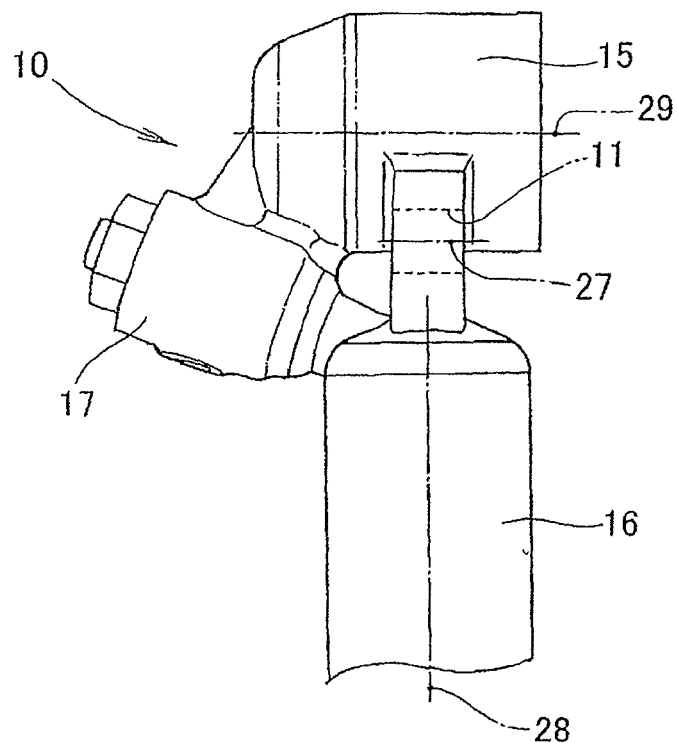
FIG. 2 is a view taken in the direction shown by an arrow 2 of FIG. 1.

As shown in FIG. 2, the upper end support hole 11 is provided such that the axis 27 thereof is substantially perpendicular to the axis 28 of the cylinder member. The reserve tank 15 is disposed such that an axis 29 of the reserve tank 15 is parallel to the axis 27 of the upper end support hole.

Figure 3:
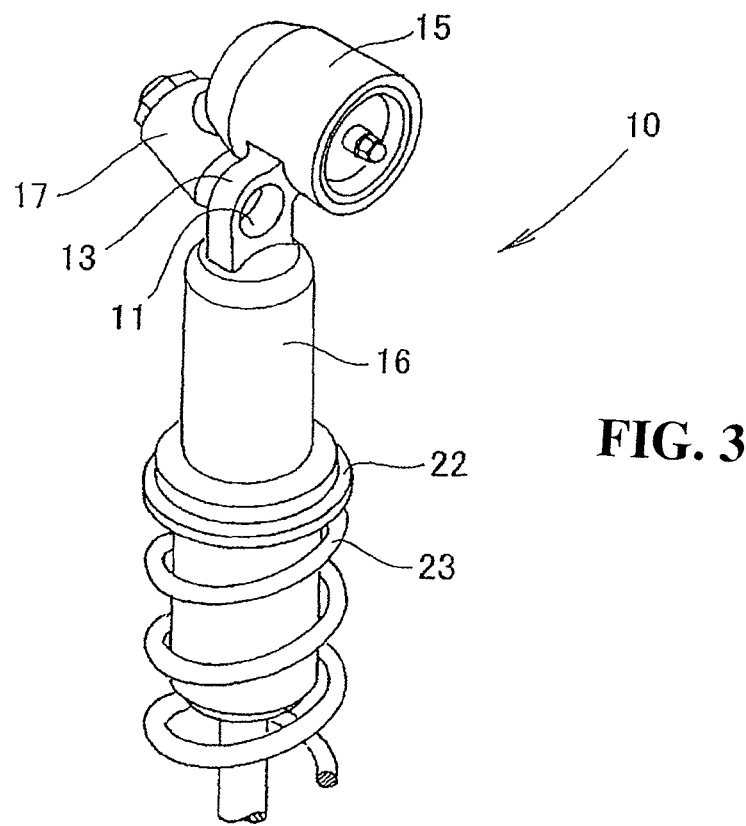
FIG. 3 is a perspective view of the shock-absorber according to the embodiment of the present invention.

As shown in FIG. 3, in the upper portion of the shock-absorber 10, the upper stay portion 13 is secured to the cylinder member 16, and the adjuster portion 17 and the reserve tank 15 are integrally provided. The adjuster portion 17 and the reserve tank 15 are integrally provided on the cylinder member 16 that can reduce the number of parts such as a stay for mounting the reserve tank 15 compared to the case where the reserve tank 15 is separately provided.

Figure 4:
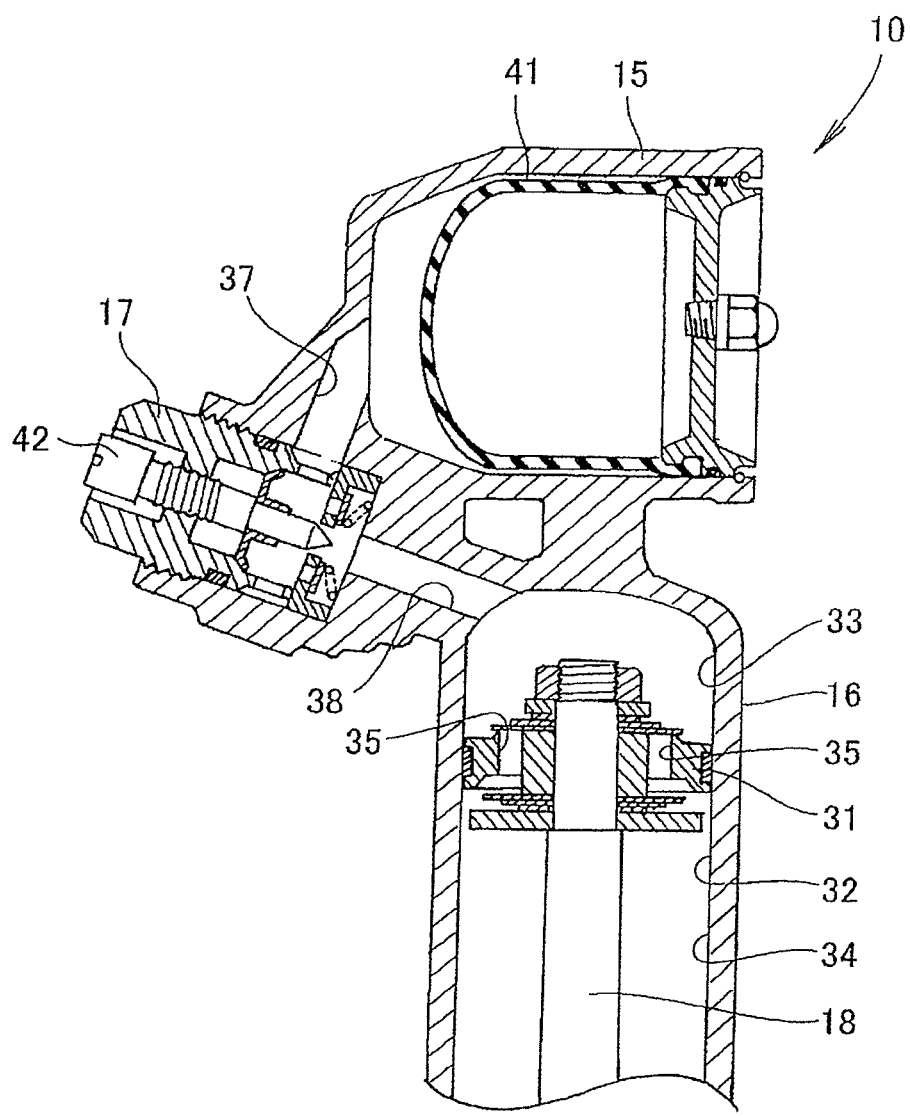
FIG. 4 is a sectional view of the upper portion of the shock-absorber according to the embodiment of the present invention.

Next, the sectional construction of the upper portion of the shock-absorber will now be described. As shown in FIG. 4, the shock-absorber 10 includes the cylinder member 16 that is disposed such that its longitudinal direction coincides with the vertical direction of a vehicle; a piston 31 that is accommodated in the cylinder member 16 so as to be movable with the piston rod 18 extending downward from the piston 31. The cylindrical reserve tank 15 is attached to the cylinder member 16 for reserving the excessive hydraulic operating fluid with the adjuster portion 17 that is interposed between the reserve tank 15 and the cylinder member 16 for changing the sliding velocity of the piston 31.

The piston 31 moves in a damper chamber 32 forming the inside of the cylinder member 16, and divides the damper chamber 32 into a first chamber 33 and a second chamber 34. The piston 31 is provided with a plurality of orifices 35 that communicate between the first chamber 33 and the second chamber 34 and allow the hydraulic operating fluid to move therebetween. In addition, a first passage 37 through which the hydraulic operating fluid passes is formed between the reserve tank 15 and the adjuster portion 17. Further, a second passage 38 through which the hydraulic operating fluid passes is formed between the adjuster portion 17 and the damper chamber 32. All of the damper chamber 32, the first passage 37 and the second passage 38 are filled with the hydraulic operating fluid.

The reserve tank 15 is provided with a rubber-made pressure vessel 41 for applying pressure to the hydraulic operating fluid within the reserve tank. For example, compressed nitrogen is encapsulated in the pressure vessel 41. Further, a needle valve 42 for adjusting the flow volume of the hydraulic operating fluid is rotatably attached to the adjuster portion 17.

As illustrated in FIG. 1, the reserve tank 15 is arranged such that the axis 29 thereof is positioned above the upper end 20 of the support hole as well as outside the outer surface 19 of the cylinder member when viewed visually along the axis 27 of the support hole.

Next, a motorcycle comprising a shock-absorber will now be described.

Figure 5:
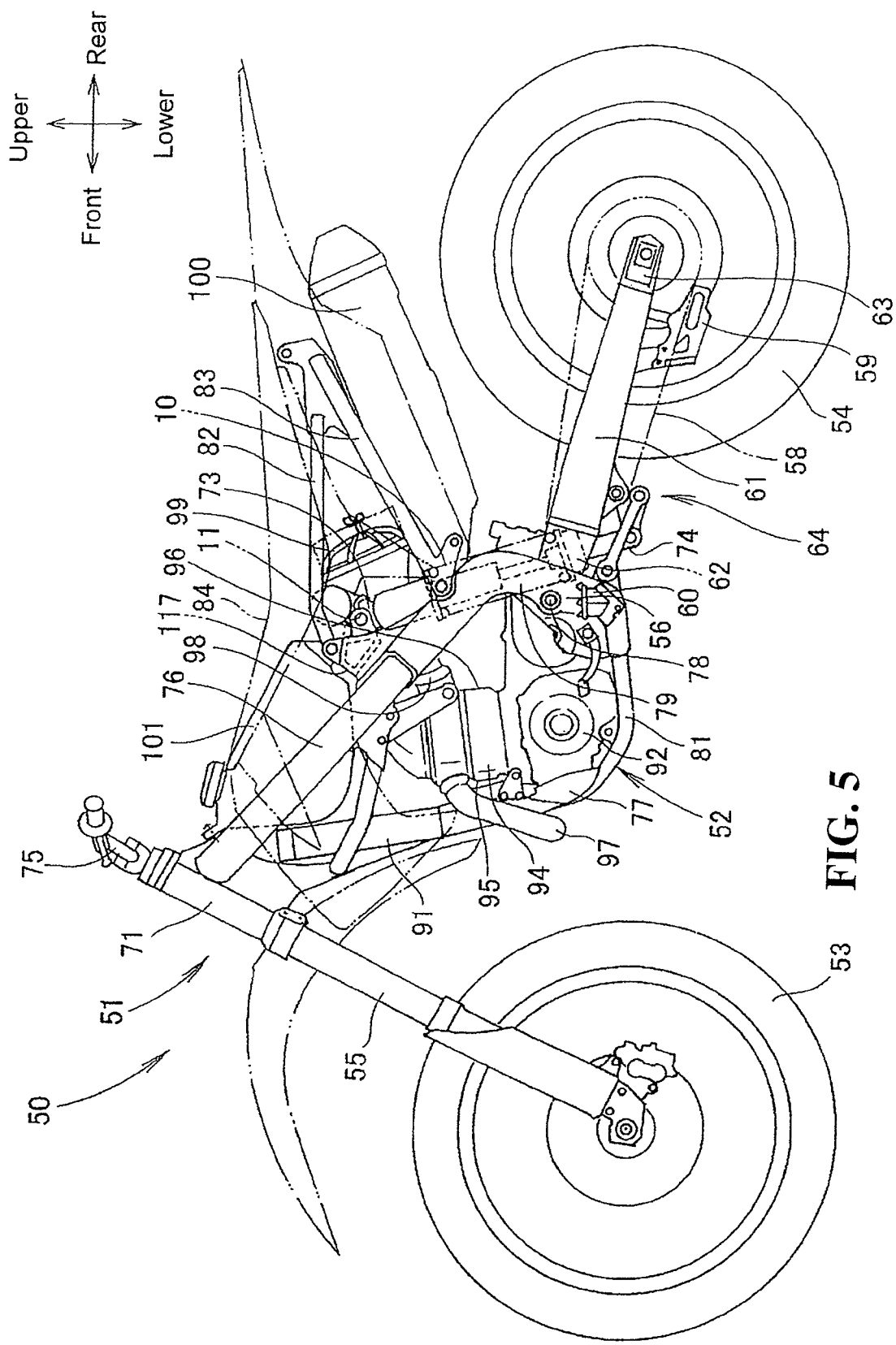
FIG. 5 is the motorcycle comprising the shock-absorber according to the embodiment of the present invention.

As shown in FIG. 5, a motorcycle 50 includes a body frame 51; an engine 52 suspended on the body frame 51; front forks 55 that are attached to a head pipe 71 of the body frame 51 for supporting a front wheel 53; a swing arm 61 with a front end 62 swingably supported by a pivot frame 56 of the body frame 51 and with a rear end 63 rotatably supporting a rear wheel 54. The shock-absorber 10 includes a lower end 74 supported by the swing arm 61 via a link 64 and an upper end supported by the body frame 51 via the upper end support hole 11 with the axis thereof extending substantially horizontally. A steering handle 75 is mounted on the front forks 55.

Although the link is interposed between the swing arm and the shock-absorber in the embodiment of the present invention, the link may be omitted.

The body frame 51 comprises the head pipe 71; a main frame 76 extending downward to the rear direction of the vehicle from the head pipe 71 and down frames 77 extending downward to the rear direction of the vehicle from the head pipe 71 below the main frame 76. A pivot frame portion 79 extends downward from the rear end of the main frame 76 and has a pivot portion 78 supporting the swing aim 61. A lower frame portion 81 extends to the rear direction of the vehicle from the lower end portion of the down frame 77 and is connected to the pivot frame 56 with a main cross member 117 that extends at the rear portion of the main frame 76 in the width direction of a vehicle. Seat frames 82 extends to the rear direction of the vehicle from the main frame 76 with sub-frames 83 supporting the seat frames 82. The seat frames 82 are members mounted on the rear portion of the main frame 76 and supporting a seat 84 on which a rider sits.

Although the front end of the swing arm is supported by the body frame in the embodiment of the present invention, the front end of the swing arm may be supported by the engine.

A radiator unit 91 is provided on the down frame 77. The engine 52 suspended on the body frame 51 has a crankcase 92 and a cylinder portion 94 mounted above the crankcase 92. An exhaust pipe 97 extends from a front surface 95 of the cylinder portion with a connecting tube 98 being jointed to a rear surface 96 of the cylinder portion. An air cleaner 99 is jointed to the connecting tube 98 at the rear portion of the connecting tube 98 with reference to the vehicle.

The exhaust pipe 97 is turned around after extending to the front direction from the cylinder portion 94 and extends to the rear direction of the vehicle, to the rear end of which a muffler 100 is jointed. A fuel tank 101 is disposed above the cylinder portion 94. The fuel tank 101 is attached to the main frame 76.

A chain 58 for transferring the driving force is wound between the engine 52 and a rear wheel 54. A chain guide 59 that reduces the vertical and lateral vibration of the chain 58 is attached to the swing arm 61. A footrest 60 on which a rider put his/her foot on is mounted on the lower portion of the pivot frame portion 79 so as to extend outward in the width direction of a vehicle.

Next, the arrangement construction and the like of the shock-absorber will now be described.

Figure 6:
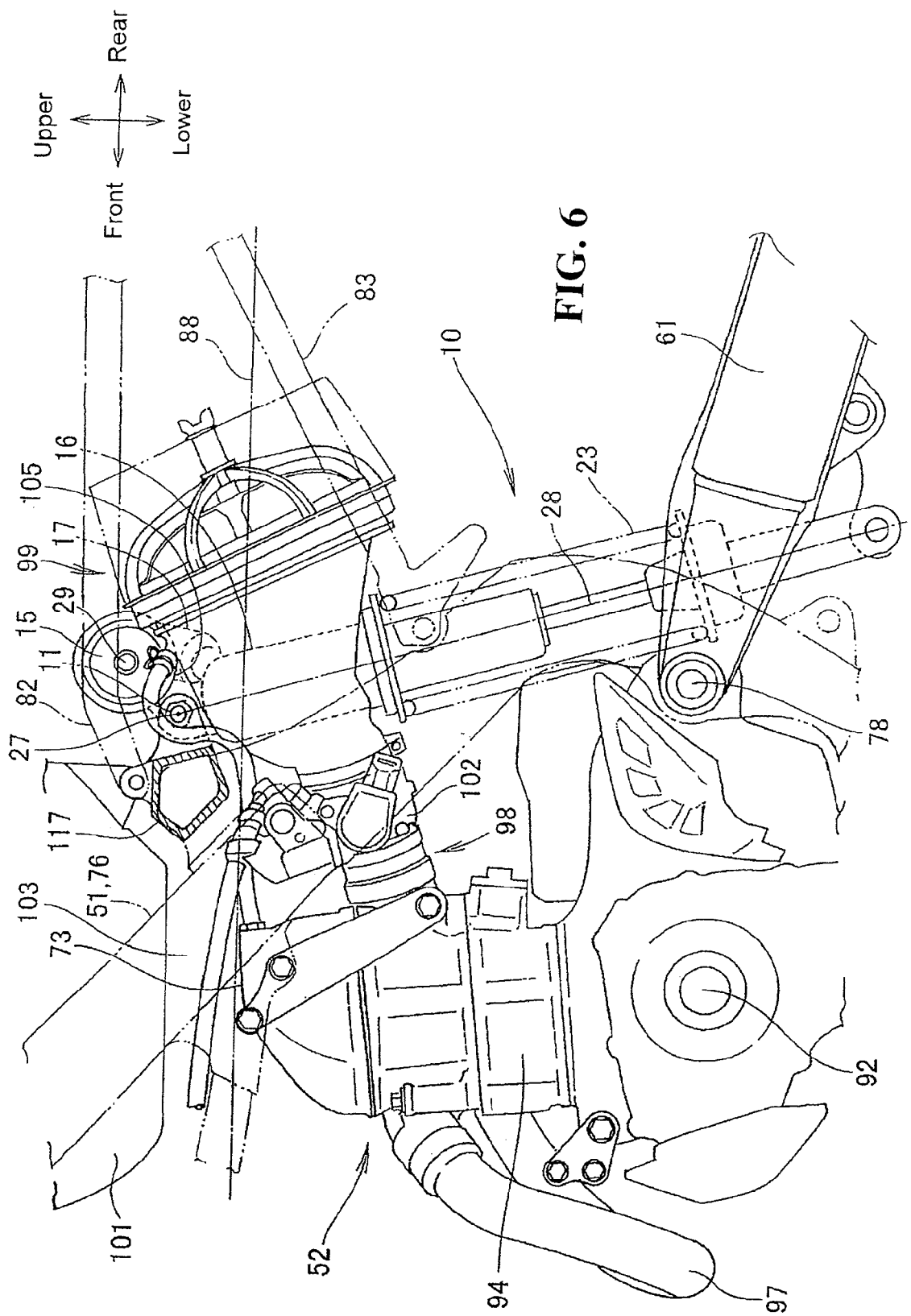
FIG. 6 is a left side view of an essential part of the motorcycle describing the shock-absorber and its peripheral part.

As shown in FIG. 6, the engine 52 is disposed in front of the shock-absorber 10 and an air cleaner 99 is disposed behind the shock-absorber 10 with reference to the vehicle. The air cleaner 99 is connected with the engine 52 by the connecting tube 98. A throttle body 102 for adjusting the supply of fuel is interposed in the connecting tube 98.

The fuel tank 101 is provided above the engine 52 in a space 103 through which of a flow of air flows. The reserve tank is arranged such that an outer circumferential lower end 105 of the reserve tank is positioned above the upper end 73 of the engine 52.

The shock-absorber 10 includes the cylindrical reserve tank 15 for reserving the hydraulic operating fluid flowing into the shock-absorber 10. The reserve tank 15 is disposed so as to overlap the seat frames 82 in a side view of the vehicle.

The sides of the reserve tank 15 are guarded by the seat frames 82 that can protect the reserve tank 15 from external forces.

The shock-absorber 10 is attached to the body frame 51 such that the outer circumferential lower end 105 of the reserve tank is substantially on the same level as or higher than the axis 27 of the support hole 11 in a side view of the vehicle. The reserve tank 15 is arranged such that the central axis 29 in the radial direction thereof is positioned above the axis 27 of the support hole 11 provided on the upper end of the shock-absorber 10.

In the drawing, a virtual line 88 extends horizontally to the upper end of the cylinder portion 94 of the engine.

Next, the construction of the shock-absorber and its peripheral parts in a right side view of the vehicle will now be described.

Figure 7:
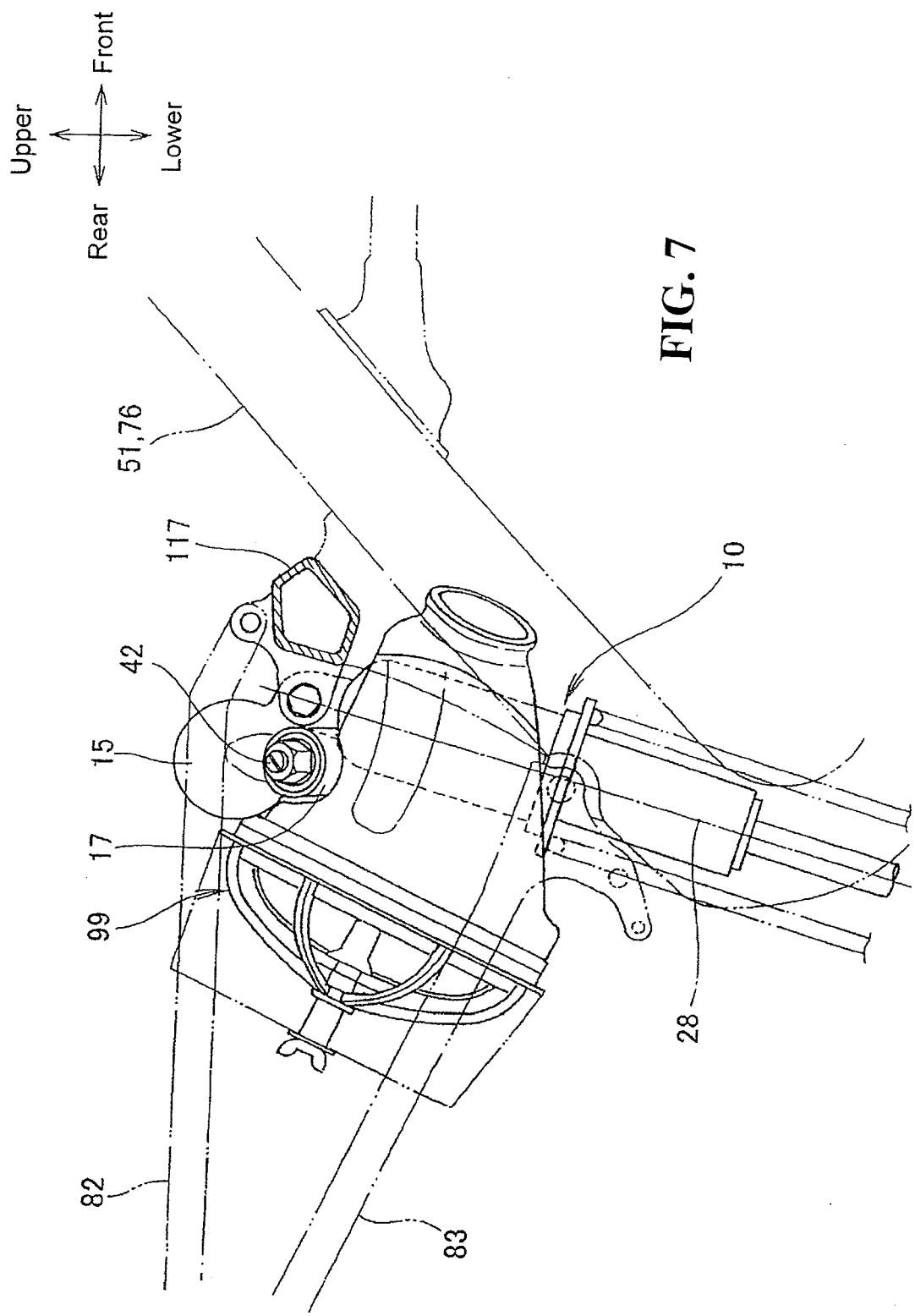
FIG. 7 is a right side view of an essential part of the motorcycle describing the shock-absorber and its peripheral part.

As shown in FIG. 7, the connecting tube 98 extending from the air cleaner 99 passes laterally outside the shock-absorber 10 and extends to the engine (reference number 52 in FIG. 6) provided on the front side of the vehicle with reference to the air cleaner 99.

The needle valve 42 of the adjuster portion 17 enables the easy adjustment of the damper characteristic of the shock-absorber 10 by inserting a tool from the right side in the width direction of the vehicle.

Next, the construction of the shock-absorber and its peripheral parts when viewed from the top will now be described.

Figure 8:
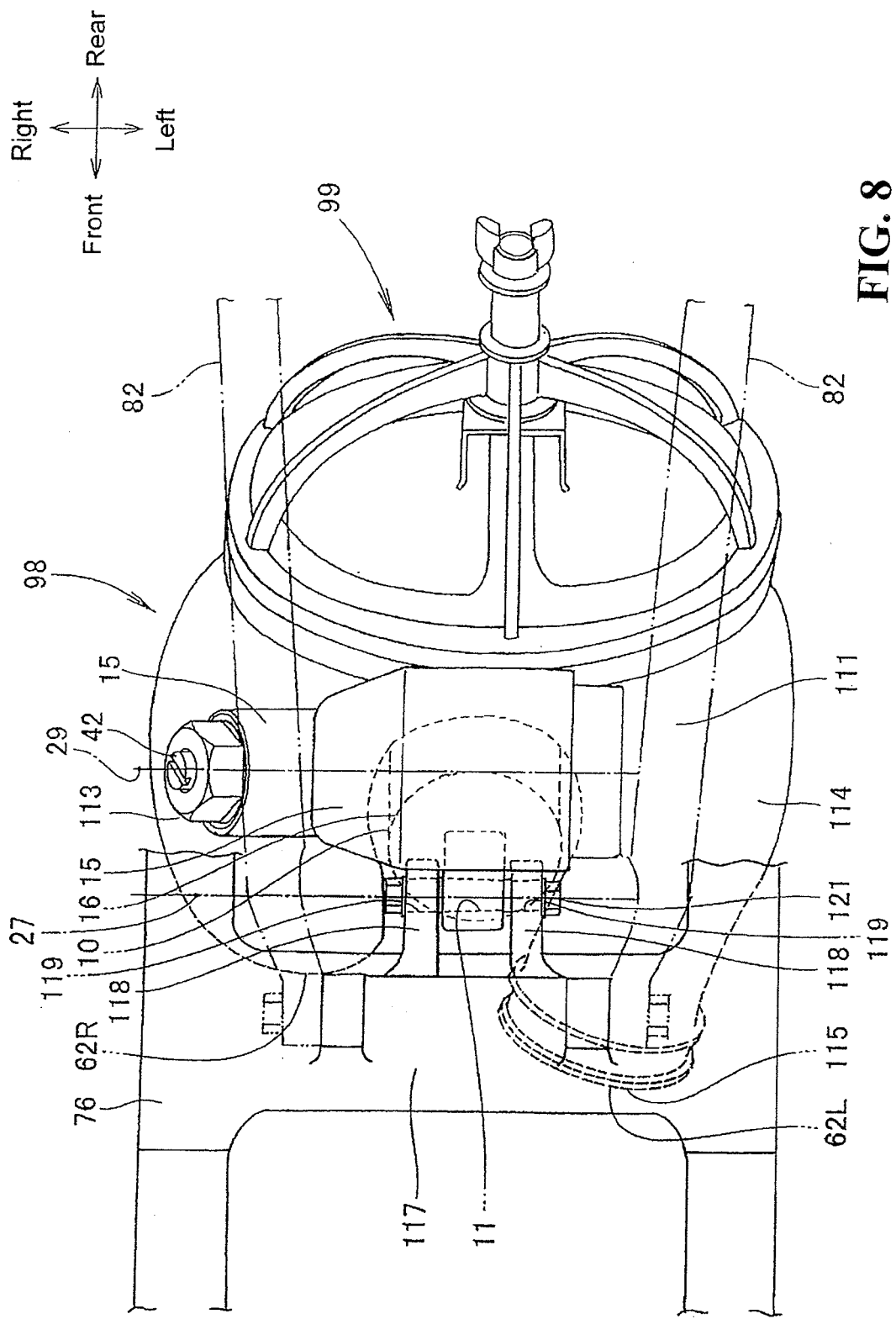
FIG. 8 is a plan view of an essential part of the motorcycle describing the shock-absorber and its peripheral part.

As shown in FIG. 8, the main cross member 117 extends on the upper side of the rear portion of the main frame 76 in the width direction of a vehicle with cushion stays 118, 118 being attached to the main cross member 117. Holes 119, 119 are made in the cushion stays 118, 118, respectively, with the upper end of the shock-absorber 10 being attached to the cushion stays 118, 118 with a fastening member 121 by aligning the upper end support hole 11 of the shock-absorber with the holes 119, 119.

The reserve tank 15 which is included in the shock-absorber 10 is disposed such that the axis 29 thereof extends in the width direction of a vehicle.

The connecting tube 98 comprises a rear portion 111 that is connected to the air cleaner 99, a right tube 113 extending from the rear portion 111 on the right side in the width direction of a vehicle, and a left tube 114 extending on the left side in the width direction of a vehicle from the rear portion 111.

More specifically, the connecting tube 98 is disposed on left and right sides of the shock-absorber 10 in the width direction of a vehicle. While a front end 62R of the right tube 113 with reference to the vehicle is closed, a front end 62L of the left tube 114 with reference to the vehicle has an opening portion 115, in which the throttle body (reference numeral 102 in FIG. 6) is interposed. Thus, air which is cleaned via the air cleaner 99 flows from the opening portion 115 toward the engine (reference numeral 52 in FIG. 6).

Although the front end of the right tube is closed in the embodiment of the present invention, the right tube may be jointed to the left tube by extending the front end thereof.

The connecting tube 98 is arranged so as to surround the shock-absorber 10, which can increase the capacity of the connecting tube 98. The connecting tube 98 includes the left and right tubes 114, 113 that can secure the larger intake capacity compared to the case where the connecting tube 98 is disposed either left or right side of the shock-absorber 10 in the width direction of a vehicle. As a result, the intake efficiency is increased according to the increased capacity of the connecting tube 98 that thereby can improve the output characteristics of the engine.

The cylinder member 16 of the shock-absorber 10 is disposed between the left and right tubes 114, 113, and the reserve tank 15 is disposed above the left and right tubes 114, 113.

Referring also to FIG. 1, the axial directions of the reserve tank 15 and the cylinder member 16 are substantially perpendicular to each other, so that they are not arranged alongside. Thus, there is no need to consider the interference of the reserve tank 15 with the exhaust pipe, and the exhaust pipe 97 which is larger in outside diameter can be arranged on the side of the shock-absorber 10. The exhaust efficiency is improved by making the outside diameter of the exhaust pipe 97 larger, which thereby can improve the output characteristics of the engine 52.

The operation of the motorcycle comprising the above-mentioned shock-absorber will now be described.

Figure 9:
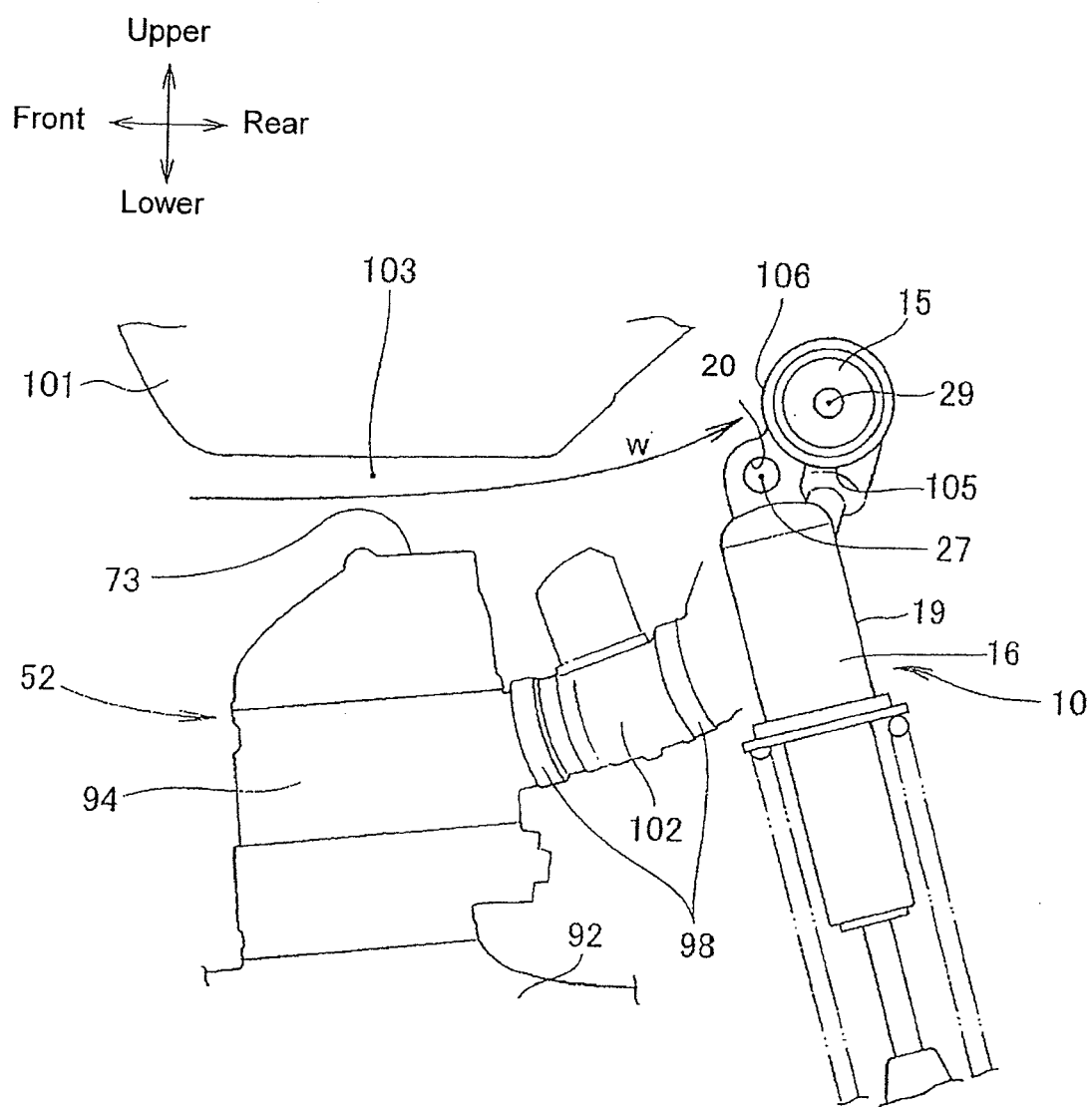
FIG. 9 is drawing describing the operation of the reserve tank provided on the shock-absorber.

As shown in FIG. 9, the axis 29 of the reserve tank is positioned above the axis 27 of the support hole. Therefore, most of the cylindrical reserve tank 15 is not shielded by the shock-absorber 10 in a front view of a vehicle.

The outer circumferential lower end 105 of the reserve tank is substantially on the same level as or higher than the axis 27 of the support hole 11 of the shock-absorber. Since at least the larger area of the reserve tank 15 is disposed in the upper portion of the shock-absorber 10, the exposed surface area of the reserve tank 15 becomes further larger in the front view of a vehicle. As a result, it is possible to enhance the cooling performance of the shock-absorber 10 and to suppress the rise in temperature of the shock-absorber 10.

The axis 29 of the reserve tank is positioned above the upper end 20 of the support hole of the cylinder member 16 and outside the outer surface 19 of the cylinder member. It makes difficult for the cylinder member 16 to shield the reserve tank 15 compared to the case where the axis 29 of the reserve tank is positioned inside the outer surface 19 of the cylinder member or lower than the upper end 20 of the support hole of the cylinder member 16, which allows the flow of air to easily hit the reserve tank 15. As a result, it is possible to further enhance the cooling performance of the shock-absorber 10.

The outer circumferential lower end 105 of the reserve tank is disposed above the upper end 73 of the engine.

The air flowing in the space 103 flows in the direction of an arrow W in the drawing, and hits an outer circumference 106 of the reserve tank without being shielded by the engine 52, which thereby can easily cool down the reserve tank 15. Further, the reserve tank 15 is disposed above the upper end 73 of the engine, which can reduce the heat affection of the engine 52 by extending the distance between the engine 52 producing heat and the reserve tank 15.

In FIG. 8, since the axis 29 of the reserve tank extends in the width direction of a vehicle, the surface area of the reserve tank 15 becomes further larger in the front view of a vehicle compared to the case where the axis 29 of the reserve tank extends in the front-rear direction of a vehicle. Since the axis 29 of the reserve tank 15 is positioned in the rear with reference to the vehicle as well as above the axis 27 of the support hole 11, the reserve tank is not shielded by the shock-absorber 10 and the surface area thereof becomes larger in the front view of a vehicle. As a result, the rise in temperature of the reserve tank 15 can be suppressed, which thereby can suppress the rise in temperature of the shock-absorber 10.

Having thus applied the present invention to motorcycles according to the specific embodiment, the present invention is applicable to three-wheeled vehicles and also may be applied to general vehicles.

The present invention is preferable to motorcycles including the shock-absorber.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
a body frame;
an engine supported by said body frame;
a swing arm having a front end swingably supported by said body frame or said engine and a rear end rotatably supporting a rear wheel;
a shock-absorber having a lower end supported by the swing arm and an upper end support hole with an axis thereof extending in a width direction of the vehicle with respect to said body frame for supporting an upper end of said shock-absorber; and
a cylindrical reserve tank connected to the shock-absorber for reserving hydraulic operating fluid flowing into said shock-absorber;
wherein an axis of said cylindrical reserve tank is arranged in the width direction the vehicle, the axis of said reserve tank is positioned above the axis of said upper end support hole of said shock-absorber in a side view,
wherein a fuel tank is disposed above said engine in a space through which a flow of air flows; said reserve tank is arranged such that the outer circumferential lower end of said reserve tank is positioned above the upper end of said engine.

2. The vehicle according to claim 1, wherein said shock-absorber is attached to said body frame such that the outer circumferential lower end of said reserve tank is substantially on the same level as or higher than said axis of said support hole in a side view of the vehicle.

3. The vehicle according to claim 1, wherein said body frame includes a head pipe, a main frame extending downward to the rear direction of the vehicle from said head pipe, and seat frames mounted on the rear portion of said main frame and supporting a seat on which a rider sits and said reserve tank is disposed between a pair of left and right seat frames so as to overlap said seat frames in a side view of the vehicle.

4. The vehicle according to claim 2, wherein said body frame includes a head pipe, a main frame extending downward to the rear direction of the vehicle from said head pipe, and seat frames mounted on the rear portion of said main frame and supporting a seat on which a rider sits and said reserve tank is disposed between a pair of left and right seat frames so as to overlap said seat frames in a side view of the vehicle.

5. The vehicle according to claim 1, wherein said engine is disposed in front of said shock-absorber and an air cleaner is disposed behind said shock-absorber with reference to the vehicle; said air cleaner is connected with said engine by a connecting tube; and said connecting tube is disposed on left and right sides of said shock-absorber in the width direction of the vehicle.

6. The vehicle according to claim 2, wherein said engine is disposed in front of said shock-absorber and an air cleaner is disposed behind said shock-absorber with reference to the vehicle; said air cleaner is connected with said engine by a connecting tube; and said connecting tube is disposed on left and right sides of said shock-absorber in the width direction of the vehicle.

7. The vehicle according to claim 3, wherein said engine is disposed in front of said shock-absorber and an air cleaner is disposed behind said shock-absorber with reference to the vehicle; said air cleaner is connected with said engine by a connecting tube; and said connecting tube is disposed on left and right sides of said shock-absorber in the width direction of the vehicle.

8. A shock absorber in combination with a vehicle comprising:
said shock-absorber having a lower end adapted to be supported by a swing arm and an upper end support hole with an axis thereof extending in a width direction of a of the vehicle with respect to a body frame for supporting an upper end of said shock-absorber; and
a cylindrical reserve tank connected to the shock-absorber for reserving hydraulic operating fluid flowing into said shock-absorber;
wherein an axis of said cylindrical reserve tank is arranged in the width direction of the vehicle, the axis of said reserve tank is positioned above the axis of said upper end support hole of said shock-absorber in a side view,
wherein an engine is disposed in front of said shock-absorber and an air cleaner is disposed behind said shock-absorber with reference to the vehicle; said air cleaner is connected with said engine by a connecting tube; and
said connecting tube is disposed on left and right sides of said shock-absorber in the width direction of the vehicle,
wherein a fuel tank is disposed above an engine in a space through which a flow of air flows; said reserve tank is arranged such that the outer circumferential lower end of said reserve tank is positioned above the upper end of said engine.

9. A shock absorber in combination with a vehicle according to claim 8, wherein said shock-absorber is attached to said body frame such that the outer circumferential lower end of said reserve tank is substantially on the same level as or higher than said axis of said support hole in a side view of the vehicle.

10. A shock absorber in combination with a vehicle according to claim 9, wherein said body frame includes a head pipe, a main frame extending downward to the rear direction of the vehicle from said head pipe, and seat frames mounted on the rear portion of said main frame and supporting a seat on which a rider sits and said reserve tank is disposed between a pair of left and right seat frames so as to overlap said seat frames in a side view of the vehicle.

11. A shock absorber in combination with a vehicle comprising:
said shock-absorber having a lower end adapted to be supported by a swing arm and an upper end support hole with an axis thereof extending in a width direction of the vehicle with respect to a body frame for supporting an upper end of said shock-absorber; and
a cylindrical reserve tank connected to the shock-absorber for reserving hydraulic operating fluid flowing into said shock-absorber;
wherein an axis of said cylindrical reserve tank is arranged in the width direction of the vehicle, the axis of said reserve tank is positioned above the axis of said upper end support hole of said shock-absorber in a side view;
wherein an engine is disposed in front of said shock-absorber and an air cleaner is disposed behind said shock-absorber with reference to the vehicle;
said air cleaner is connected with said engine by a connecting tube; and
said connecting tube is disposed on left and right sides of said shock-absorber in the width direction of the vehicle,
wherein said body frame includes a head pipe, a main frame extending downward to the rear direction of the vehicle from said head pipe, and seat frames mounted on the rear portion of said main frame and supporting a seat on which a rider sits and said reserve tank is disposed between a pair of left and right seat frames so as to overlap said seat frames in a side view of the vehicle.

12. A shock absorber in combination with a vehicle according to claim 11, wherein a fuel tank is disposed above an engine in a space through which a flow of air flows; said reserve tank is arranged such that the outer circumferential lower end of said reserve tank is positioned above the upper end of said engine.

* * * * *